United States Patent [19]
Aino

[11] Patent Number: 5,982,131
[45] Date of Patent: Nov. 9, 1999

[54] CONTROL DEVICE FOR MOTOR DRIVING SYSTEM

[75] Inventor: Yokuji Aino, Shizuoka, Japan

[73] Assignee: Aino Seisakusho Co., Ltd., Osaka, Japan

[21] Appl. No.: 08/750,043

[22] PCT Filed: May 25, 1995

[86] PCT No.: PCT/JP95/01002

§ 371 Date: Nov. 29, 1996

§ 102(e) Date: Nov. 29, 1996

[87] PCT Pub. No.: WO95/33303

PCT Pub. Date: Dec. 7, 1995

[30] Foreign Application Priority Data

May 31, 1994 [JP] Japan ................................. 6-118053

[51] Int. Cl.[6] .................................................. G05D 15/00
[52] U.S. Cl. ........................... 318/646; 310/51; 310/89; 318/282; 318/450; 318/475; 318/488
[58] Field of Search .......................... 310/99, 51, 85–91; 318/270, 646, 280–300, 445–489

[56] References Cited

U.S. PATENT DOCUMENTS

| | | | |
|---|---|---|---|
| 3,729,641 | 4/1973 | Sato et al. ................................. | 310/54 |
| 4,375,047 | 2/1983 | Nelson et al. ............................. | 318/48 |
| 4,492,906 | 1/1985 | Goto et al. ................................ | 318/488 |
| 4,853,578 | 8/1989 | Takahashi et al. ....................... | 310/315 |
| 5,184,038 | 2/1993 | Matsui et al. ............................. | 310/42 |

FOREIGN PATENT DOCUMENTS

| | | |
|---|---|---|
| 9-9025 | 7/1934 | Japan . |
| 49-135119 | 12/1974 | Japan . |
| 50-7450 | 3/1975 | Japan . |
| 50-7451 | 3/1975 | Japan . |
| 51-137900 | 11/1976 | Japan . |
| 59-047945 | 3/1984 | Japan . |

*Primary Examiner*—David Martin

[57] ABSTRACT

A stator 3 of a motor 1 is pivotally supported on a stationary system 5 by an elastic member 28, 11a, 42 provided along the circumferential direction of the stator 3, and a detector 11 for detecting a rotational force of the stator 3 is provided to execute the control of stopping, accelerating, decelerating or reversing the operation of the motor 1 based on a detection signal from the detector 11. When the motor load is increased, transmission of torque from the action system 3 to the reaction system 4 of the motor 1 is cut off, and consequently the stator 3 itself of the motor 1 pivots with respect to the stationary system 5 as a reaction. In this stage, the detector 11 detects the rotational force of the stator 3 to stop, accelerate, decelerate, or reverse the operation of the motor 1.

14 Claims, 3 Drawing Sheets

FIG. 6A  FIG. 6B

CONTROL DEVICE FOR MOTOR DRIVING SYSTEM

TECHNICAL FIELD

The present invention relates to a control device for a motor driving system which executes the control of stopping, accelerating, decelerating or reversing the operation of a drive system of a motor taking advantage of an electromagnetic interaction between its stator and its rotor in order to optimize the operating state of a load system driven by the motor. The present invention can be used for any of an automatic door, a power window of an automobile and a torque limiter in a torque wrench or the like, and utilized for torque control concerning cutting resistance of an NC lathe, grip of a robot or for constant acceleration control of a vehicle such as an elevator or train. The motor of the present invention is controlled by appropriately utilizing an interaction between the stator and the rotor, and therefore, the present inventor calls this motor AICE (Appropriately Interaction-Controlled Electromotor).

BACKGROUND ART

Conventionally, there has been known one in which, when a load system driven by a motor has been operated by a specified target amount, the drive system is automatically stopped. For example, in the case of a power window of an automobile, its motor is driven with a switch operation by the crew to move the window glass downward or upward, and upon achieving full open or full closure, a limit switch or a pressure-sensitive sensor operates to automatically stop the motor. Also, in the case of an elevator, an automatic door, a shutter or the like, it is normal to stop its drive system by position control with a limit switch or the like as described above.

In the aforementioned control device for motor driving system, the drive system stops at the point of time when the load system reaches a specified target position. Therefore, the drive system does not stop even if any error occurs until it reaches the target position. For the above reasons, a variety of irreparable troubles occur sometimes. For example, in the case of the aforementioned power window, there has been the danger that a human hand or neck may be caught in the opening or closing window glass to get injured.

Thus, the prior art apparatus detects the achievement of its purpose of moving the load system by a specified amount by means of a limit switch or a pressure-sensitive sensor and feeds this back to the motor to stop it. Therefore, the system has been unable to cope with the aforementioned error occurring in the course of achieving the purpose. Accordingly, there has been taken the measure of providing a torque limiter or the like between the motor and the load or detecting the error by reading a change of current or phase of a motor power source. However, they are easily influenced by the fluctuation of the power source or temperature, and therefore, no correct control can be expected.

A position detecting means of the limit switch or the pressure-sensitive sensor requires a stationary fixed member in order to fix the detection means. For example, in the case of the power window, the limit switch and the pressure-sensitive sensor are mounted to the window frame. However, in an automobile having no window frame, it is difficult to provide a position detecting means such as the limit switch or the pressure-sensitive sensor. In such a case, it has been executed to drive the motor by means of an inverter and stop the motor by detecting a torque increase as a consequence of the change of its input current or to stop the motor by detecting a torque increase as a consequence of the distortion of an output shaft of the motor. However, such an apparatus generally adopts the method of measuring the change of an optical signal from a stationary system having the power source in order to measure the distortion of the rotating shaft, or the method of measuring the change of a resistance value of a strain gauge by means of a slip ring. However, either method has an unstable factor and still contains a problem in achieving correct control.

Representative motors that have been conventionally used are the direct current motor, the synchronous motor and the induction motor. The direct current motor requires maintenance since it has a mechanical commutator, and it has the disadvantages of: its voltage being not increasable; a sharp change of current being unable to be followed; its capacity being limited; and sparks being generated. In view of the above, the synchronous motor which has no commutator and of which current is controlled based on a position detection signal of its rotor has been put into practical use. However, it requires a slip ring or a rotary transformer in order to supply an excitation power to the rotor in the case of a large capacity. In contrast to this, the induction motor has a simple structure and solidity and is inexpensive. In order to freely control the induction motor similarly to the direct current motor, a vector control has been put into practice. However, complicated calculation is required for the vector control, and a stable power source is necessary. In such a conventional motor, there have been the control factors of current, voltage, frequency, angle of rotation and rotational frequency. These control factors exert influence on the fluctuation of the power source and the change of the rotational frequency, and this causes a problem that high-accuracy control cannot be executed.

DISCLOSURE OF THE INVENTION

The present invention is intended to solve the aforementioned conventional problems, and it is an object of the present invention to provide a control device for motor driving system which has a simple low-cost structure and is capable of securely and surely executing the control of stopping, accelerating, decelerating or reversing the operation of a motor drive system not only in the stage of operation and attaining its purpose but also when an error occurs in the course of the operation.

The present invention is based on an utterly novel conception and intended to control the drive system upon detecting an increase of load in a motor load system by the motor itself. That is, according to the present invention, a stator side member of the motor is pivotally supported on a stationary system by an elastic member along the circumferential direction of the stator side member, and a detection means for detecting the rotational force of the stator side member is provided, so that the control of stopping, accelerating, decelerating or reversing the operation of the motor drive system is executed based on a detection signal of the detection means.

In this case, the stator side member also denotes the stator itself as well as its casing, in the case where the stator is directly fixed to the casing of the motor, or a stator support member, in the case where a stator support means for supporting the stator is provided separately from the casing of the motor. The stationary system denotes a frame to which the motor is mounted and the body or the like of an automobile as well as a base, support block or the like for supporting the motor. Further, the motor drive system denotes the motor body as well as a power transmitting unit such as a clutch, a speed reducer and a torque converter.

In the above structure, the motor rotates by a torque exerted from its stator (action system) on its rotor (reaction system). When the load system is operated by a specified amount with the rotation of the motor to attain the goal, a motor load increases. Also, when the driving of the load system is hindered by some error before attaining the goal, the motor load increases. Further, in normal operation, resistances of the drive system and the load system with respect to the drive torque is generated.

With the existence of such increase of motor load and the resistance of the drive system and the load system, transmission of torque from the action system to the reaction system of the motor is cut off or limited, and consequently the stator side member of the motor pivots relative to the stationary system as a reaction. In this stage, when the detection means detects the rotational force of the stator side member, the present apparatus executes the control of stopping, accelerating, decelerating or reversing the operation of the drive system based on a detection signal. For example, if the detection means detects the rotational force of the stator side member when the goal is attained or an error occurs, the drive system is stopped based on the detection signal. Further, in operation, the stator member pivots as a reaction of the resistance of the drive system and the load system with respect to the drive torque. When the detection means detects the rotational force, torque control or constant acceleration control is executed by rotating the motor so that the rotational force becomes constant.

According to a preferred embodiment of the present invention, a protuberance section is provided on the outer peripheral surface of the stator side member, while a recess section opposite to the protuberance section is formed at the stationary system, so that the elastic member is compressed between the protuberance section and the recess section correspondingly as the stator side member pivots in a direction in which the stator side member pivots. For the elastic member, it is preferable to use rubber, and in particular, silicone rubber. The detection means in this embodiment is preferably provided by a displacement detection element for detecting the displacement of a projection section that is provided at the stator side member. For the displacement detection element, a mechanical displacement detector such as a limit switch or an optical or electromagnetic displacement detector such as a photosensor or a magnetic sensor can be used. Furthermore, it is acceptable that the elastic member is provided by an elastic pressure-sensitive agent and that the detection means detects the distortion of the elastic pressure-sensitive agent in the direction in which the stator side member pivots between the protuberance section of the stator side member and the recess section of the stationary system. For the elastic pressure-sensitive agent, for example, a pressure-sensitive conductive rubber obtained by incorporating conductive particles of carbon or the like into an elastic member of silicone rubber or the like can be used. In regard to this conductive rubber, it is preferable to fill a liquified one between the stator side member and the stationary system and thereafter solidify it.

According to another preferred embodiment of the present invention, the stator side member is comprised of a pair of ring-shaped stator support members which support both ends of the stator of the motor on its outer peripheral surface, and the stationary system is comprised of the casing of the motor. The stationary system includes a cylindrical projection section arranged coaxially with a motor shaft on the inner surfaces at both ends of the casing, and the stator support member is supported on the cylindrical projection section of the casing by an elastic bearing member which is elastically deformable in the direction in which the motor shaft rotates. The elastic bearing member in this embodiment is preferably provided by radially arranging spokes made of a metal plate having an elasticity between an inner ring and an outer ring. Further, the detection means of this embodiment is preferably provided by a displacement detection means such as a non-contact nonresistant digital scale.

According to the present invention, the stator side member pivots with respect to the stationary system due to the increase of load and the resistances of the drive system and the load system, and the detection means detects the rotational force to stop, accelerate, decelerate or reverse the operation of the drive system, thereby producing the following effects.

1) Not only when an error occurs in attaining the goal but also when an error occurs in the course of the operation, the drive system is appropriately controlled. Therefore, the error can be eliminated before a trouble occurs, thereby assuring security. Furthermore, there is no need to provide any high-accuracy controller such as the conventional position detecting limit switch or torque limiter, and it is required to merely provide the detection means for detecting the rotational force of the stator side member, thereby assuring a simple structure and low cost.

2) The torque control and constant acceleration control can be executed based on the rotational force of the stator side member generated as a reaction against the resistances of the drive system and the load system with respect to the drive torque of the motor in operation. Therefore, the rotational force of the stator side member generated independently regardless of the conventional control factors of current, voltage, frequency, angle of rotation, rotational frequency is utilized as a new control factor. Therefore, a high-accuracy control that is scarcely influenced by the fluctuation of the power source, rotating speed and the change of temperature can be achieved.

BRIEF DESCRIPTION OF THE DRAWINGS

FIG. 6A is an enlarged view showing of the support member of FIG. 5 arranged between the stator side member and the stationary system; and FIG. 6B is a right side view of the support member of FIG. 6.

BEST MODE FOR CARRYING OUT THE INVENTION

Figure 1:
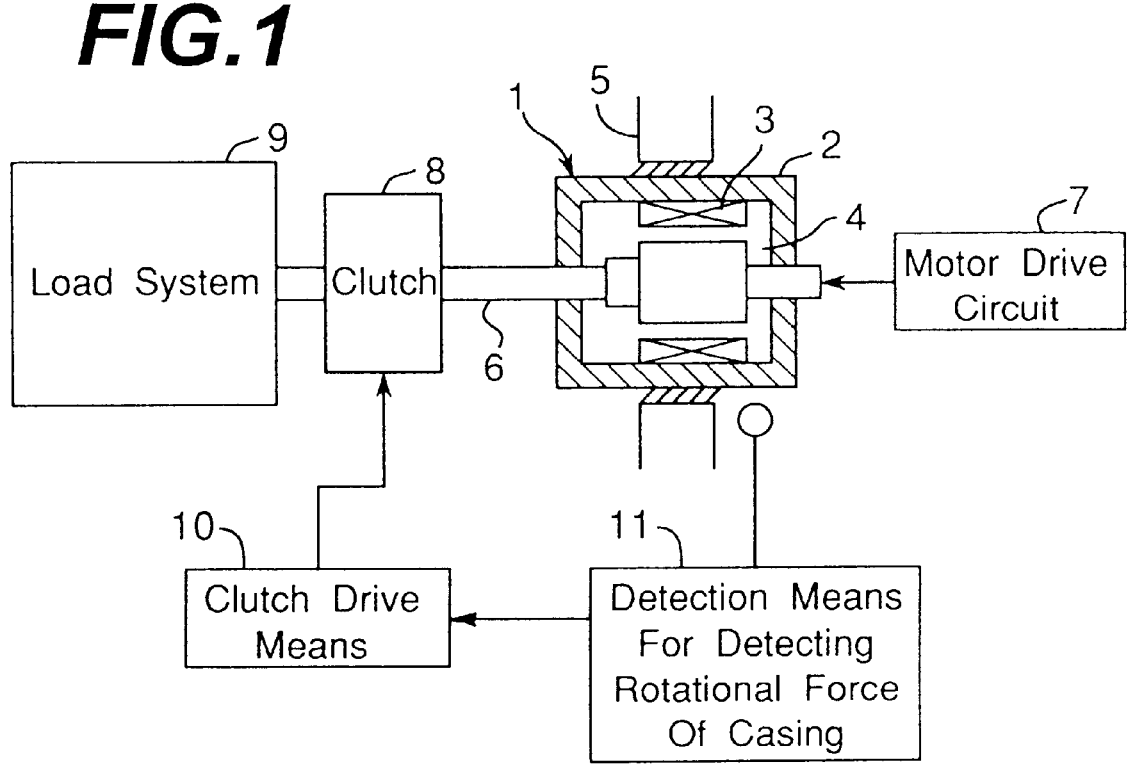
FIG. 1 is a block diagram of a control device for a motor driving system.

FIG. 1 is a block diagram of a control device for a motor driving system according to the present invention. In the figure, the reference numeral 1 denotes a motor having a stator (action system) 3 and a rotor (reaction system) 4 fixed to the inside of a casing 2. The motor 1 is pivotally mounted around a drive shaft 6 of the rotor 4 to a frame 5 which serves as a stationary system by a means as described later herein, and it is driven by a motor drive circuit 7. The drive shaft 6 of the motor 1 is connected to a load system 9 via a clutch 8.

The frame 5 is provided with a casing rotational force detection means 11 which detects the rotational force of the casing 2 of the motor 1 by converting it into a displacement and outputs the resulting detection signal to a clutch drive means 10. The clutch drive means 10 is to connect and disconnect the clutch 8 based on the detection signal from the casing rotational force detection means 11.

It is to be noted that a speed reducer or a torque converter may be used in place of the clutch 8 in FIG. 1.

Figure 2:
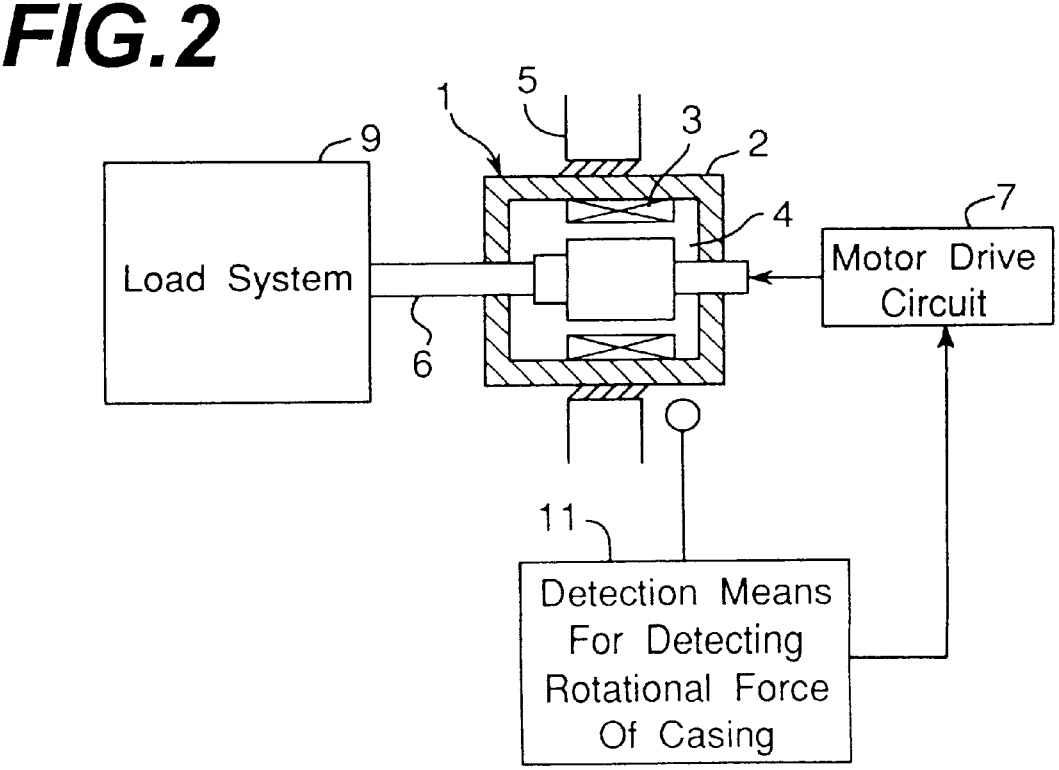
FIG. 2 is a block diagram of a control device for motor driving system of another embodiment.

FIG. 2 shows a control device for motor driving system of a type having no such clutch as shown in FIG. 1 between the motor 1 and the load system 9, where the motor 1 and its support structure are the same as those shown in FIG. 1. In the case of this apparatus, the motor drive circuit 7 is to stop the operation of the motor 1 itself based on the detection signal from the casing rotational force detection means 11.

The support structure of the motor 1 and the casing rotational force detection means 11 will be described in detail below with reference to FIG. 3.

Figure 3:
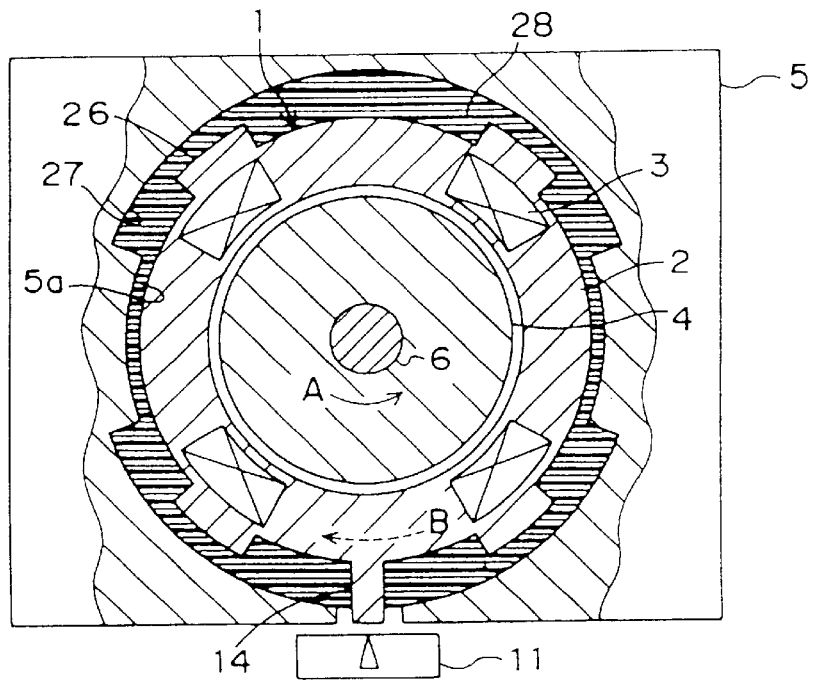
FIG. 3 is a schematic sectional view showing a motor support structure and a detection means according to a first embodiment.

In an apparatus as shown in FIG. 3, four protuberance sections 26 which extend in an axial direction are provided on the outer peripheral surface of the casing 2 of the motor 1. On the other hand, recess sections 27 which are arranged opposite to the protuberance sections 26 and in which the protuberance sections 26 are inserted are formed on the inner peripheral surface of a mounting hole 5a of the frame 5. Then, the motor 1 is pivotally supported on the frame 5 via an elastic member 28 such as rubber stuffed in a space between the casing 2 and the mounting hole 5a. A projection section 14 is provided on the outer peripheral surface of the casing 2. The reference numeral 11 denotes an optical or electromagnetic displacement detection element as the casing rotational force detection means.

In the control device for motor driving system having the above structure, when the motor 1 is started by the motor drive circuit 7 (refer to FIGS. 1 and 2), power is transmitted to the load system 9 via the clutch 8. In the starting stage or the normal operation stage of the motor 1, a counterforce takes effect on the casing 2 in a direction (B) opposite to the rotational direction (A) of the rotor 4 as a reaction of a torque exerted on the rotor 4 from the stator 3 of the motor 1. The counterforce at this point of time is small.

However, when the purpose of drive such as the completion of opening or closing a window glass of an automobile is attained in the load system 9, the load increases. Also, the load increases when some error occurs in the load system 9 of an opening/closing unit of a power window as a consequence of catching a part of a human body in the window glass or due to another cause.

When such an increase of load occurs, the counterforce effected on the casing 2 in the direction (B) opposite to the rotational direction (A) of the rotor 4 as a reaction of the torque exerted on the rotor 4 from the stator 3 of the motor 1 increases.

Consequently, by the counterforce, the casing 2 pivots in the direction (B) opposite to the rotational direction (A) of the rotor 4 against an elastic force of the elastic member 28. Then, the rotational force of the casing 2 is detected by the displacement detection element 11.

By this operation, in the drive system having the clutch 8 as shown in FIG. 1, the clutch drive means 10 disconnects the clutch 8 based on a signal of the casing rotational force detection means 11 to cut off the transmission of power, and consequently the driving of the load system 9 is stopped. In the drive system having no clutch as shown in FIG. 2, the motor drive circuit 7 stops driving the motor 1 based on the signal of the casing rotational force detection means 11, and consequently the driving of the load system 9 is stopped.

Thus, the driving of the load system 9 is stopped immediately upon the occurrence of any error in the load system 9. Therefore, in the example of the power window opening/closing unit, the danger that the window glass will shut with a hand or neck caught therein to cause injury is averted, and the possible occurrence of seizure of the motor is prevented.

As described above, the load system 9 suddenly stops before attaining its goal, so that the operator can perceive the occurrence of some error in the load system 9 and immediately take some countermeasure before it get serious. Then, by removing the factor to reduce the load, the load system 9 can be driven again.

Although the motor 1 is controlled to be stopped when the goal is attained or when an error occurs in the aforementioned embodiment shown in FIG. 2, torque control or constant acceleration control can be executed in the normal operation stage. That is, a digital scale is used as the casing rotational force detection means 11, and the rotational force of the casing 2 is detected as a digital displacement by the digital scale. The displacement is generated as a reaction against the drive torque and the resistances of the drive system and the load system. Therefore, by controlling the motor 1 by the motor drive circuit 7 so that a specified displacement can be obtained, the torque control and the constant acceleration control can be achieved.

For example, when cutting the outer peripheral surface of a rod-shaped workpiece by an NC lathe, the outer diameter of the workpiece reduces correspondingly as the cutting progresses. Consequently, the cutting resistance reduces when the rotational frequency of the workpiece is constant. However, by using the motor of the present invention as a spindle motor for the workpiece, the cutting resistance is detected as a digital displacement by the casing rotational force detection means. Therefore, by controlling the current of the motor 1 by the motor drive circuit 7 so that the displacement is maintained at a certain value, the rotational frequency of the workpiece increases correspondingly as the cutting progresses, thereby maintaining the cutting resistance constant.

By using the motor of the present invention as a motor for elevating an elevator or a motor for running a vehicle such as a train and controlling the current of the motor 1 by the motor drive circuit 7 so that the displacement detected by the casing rotational force detection means 11 becomes constant, a constant torque can be consistently applied. Therefore, the elevator is moved upward or downward and the vehicle such as a train runs at a constant acceleration.

Figure 4:
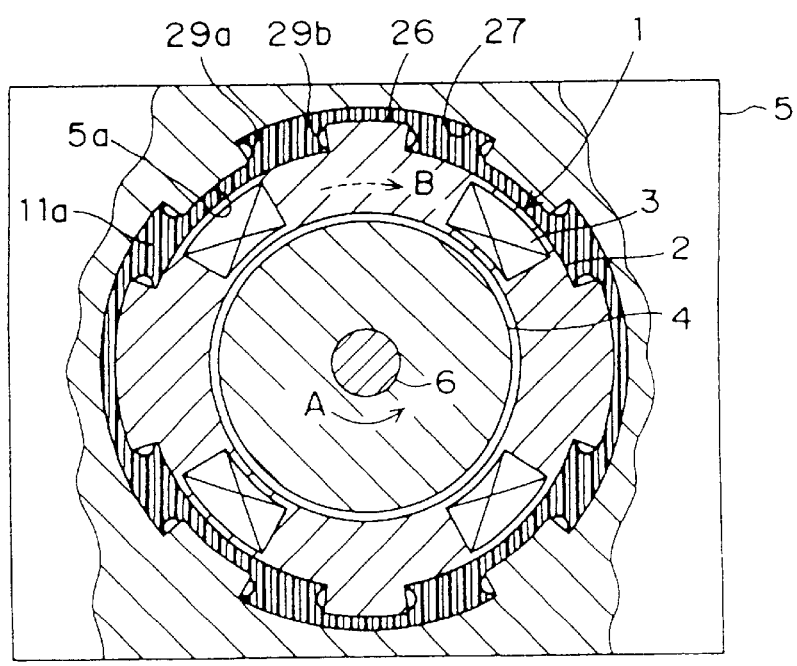
FIG. 4 is a schematic sectional view showing a motor support structure and a detection means according to a second embodiment.

FIG. 4 schematically shows another embodiment of the support structure of the motor 1 and the casing rotational force detection means 11.

In the apparatus shown in FIG. 4, similarly to the apparatus shown in FIG. 3, protuberance sections 26 are provided on the outer peripheral surface of the casing 2, while recess sections 27 are formed in the mounting hole 5a of the frame 5. Then the motor 1 is pivotally supported via an elastic pressure-sensitive agent 11d stuffed in a space between the casing 2 and the mounting hole 5a. On both side surfaces of the each protuberance section and on the end surfaces of the recess section 27 opposite to the side surface are provided electrodes 29a and 29b, respectively, so that a change of voltage due to the compressive strain of the elastic pressure-sensitive agent 11d is detected.

In this apparatus, when the casing 2 pivots due to an abnormal load, the elastic pressure-sensitive agent 11d receives a compressive strain, and consequently the voltage across the electrodes 29a and 29b changes to detect the rotational force of the casing 2.

It is to be noted that, as described above, the stator side member of the present invention includes a stator support member provided separately from the casing other than the casing 2 as shown in FIGS. 3 and 4. Furthermore, the stationary system includes a support or base for supporting the motor other than the frame 5 as shown in FIGS. 3 and 4. In this sense, modification example of the combination of the stator side member and the stationary system is shown in FIGS. 5, 6A and 6B.

Figure 5:
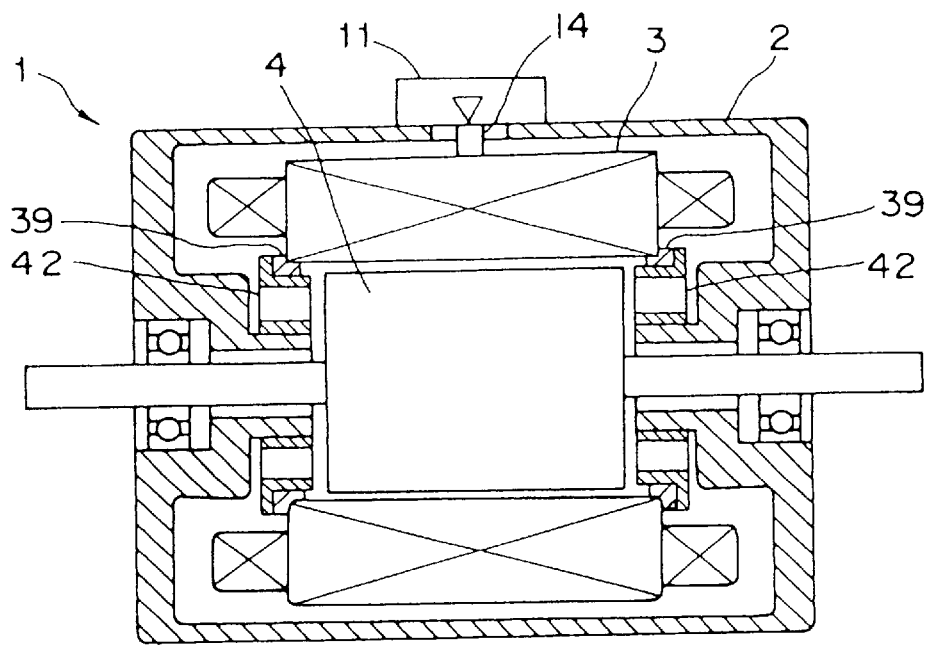
FIG. 5 is a sectional view showing a schematic sectional view showing a motor support structure and a detection means according to a third embodiment.
Figure 5:
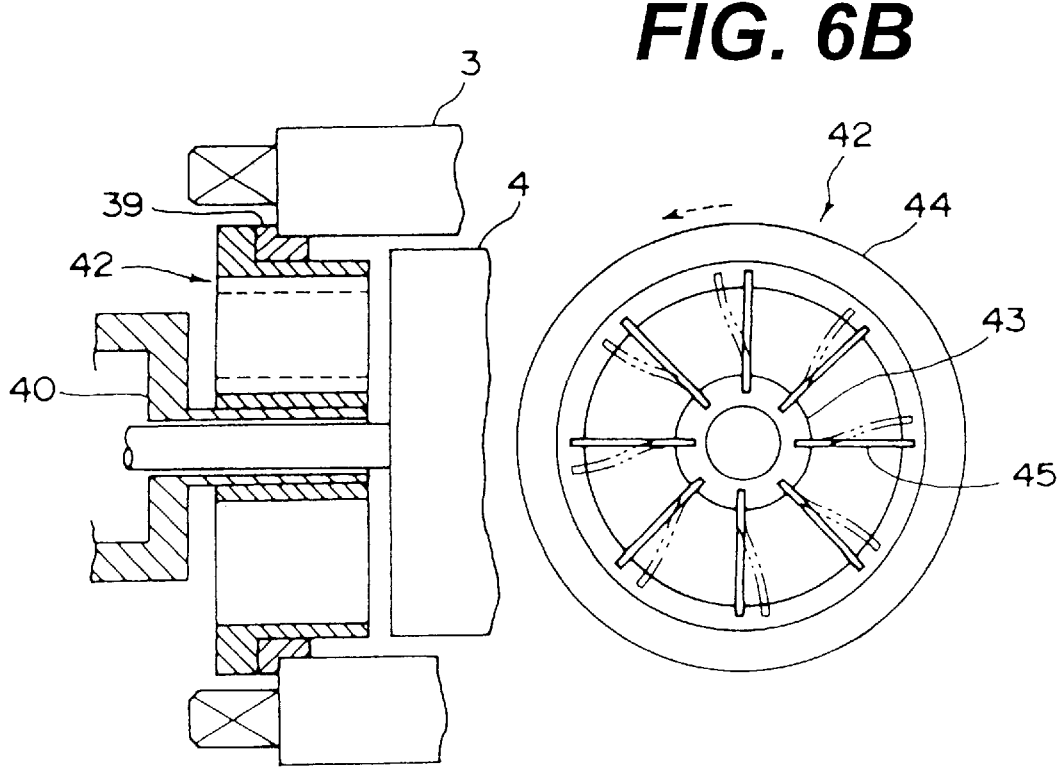

In a motor 1 as shown in FIG. 5, a stator support member 39 for supporting the stator 3 is separated from the casing 2 of the motor 1. In this case, the stator support member 39 serves as the stator side member of the present invention, while the casing 2 serves as the stationary system of the present invention. The stator support member 39 is comprised of a pair of two rings separated from each other by a specified distance, and the stator 3 is supported on the outer surface of the rings by arranging the stator 3 between both the rings. The casing 2 which serves as the stationary system has a cylindrical projection section 40 arranged coaxially with the motor shaft on both its inner surfaces, and the stator support member 39 is supported on the projection section 40 via a bearing member 42.

As shown in FIGS. 6A and 6B, the bearing member 42 is provided by radially arranging spokes 45 made of a metal plate having an elasticity between an inner ring 43 and an outer ring 44 which are made of synthetic resin, metal or the like. The inner ring 43 and the outer ring 44 pivot relative to each other against the elasticity of the spokes 45, so that a repellent force is generated at the spokes 45 in proportion to the pivotal displacement. The bearing member 42 having this configuration can be formed into an integrated body by inserting a spoke 43 in a mold for the inner ring 43 and the outer ring 44 and performing injection molding. The inner ring 43 and the outer ring 44 are preferably made of a material that is neither deteriorated through aging nor softened by heat. Furthermore, the spokes 45 are preferably made of a material of which modulus of elasticity is not changed by temperature.

In regard to the bearing member 42, when the stator 3 and the stator support member 39 receive a reaction in the direction indicated by the dashed line in FIG. 6B, the spokes 45 elastically deform as indicated by the two-dot chain lines, so that the outer ring 44 pivots together with the stator 3. Consequently, the reaction and the repellent force of the spokes 45 counterbalance with each other to stop. The rotational force of the stator 3 appears as the displacement of the projection section 14 and it is detected by the detection means 11. For the detection means 11, it is ideal to use a non-contact nonresistant digital scale. Since such a digital scale generally tends to receive thermal influence, it is preferable to thermally insulate it so as to prevent heat of the motor 1 from being conducted to it.

What is claimed is:

1. An electric motor in which a stator side member of a motor is pivotally supported on a stationary system by an elastic member, and a detection means from detecting a rotational force of the stator side member is provided so that the control of stopping, accelerating, decelerating or reversing operation of a motor drive system is executed based on a detection signal of the detection means, wherein a protuberance section is provided on an outer peripheral surface of said stator side member, and wherein a recess section opposite to said protuberance section is formed at the stationary system, said recess section having end surfaces, whereby said elastic member is disposed between the protuberance section and the recess section and compressed between the protuberance section and end surfaces of the recess section in a rotational direction of said stator side member correspondingly as said stator side member pivots.

2. The electric motor as claimed in claim 1, wherein said detection means is a displacement detection element for detecting a displacement of a projection section provided at said stator side member.

3. The electric motor as claimed in claim 1, wherein said elastic member is an elastic pressure-sensitive agent, and said detection means detects a distortion of the elastic pressure-sensitive agent in the direction in which the stator side member pivots between the protuberance section of said stator side member and the recess of the stationary system.

4. An electric motor in which a stator side member of a motor is pivotally supported on a stationary system by an elastic member, and a detection means for detecting a rotational force of the stator side member is provided so that the control of stopping, accelerating, decelerating or reversing operation of a motor drive system is executed based on a detection signal of the detection means, wherein said stator side member is comprised of a pair of ring-shaped stator support members which support both ends of the stator of said motor on its outer peripheral surface, said stationary system is comprised of a casing of said motor and provided with a cylindrical projection section arranged coaxially with a motor shaft on an inner surface of the casing, and wherein said stator support member is supported on the cylindrical projection section of said casing by an elastic bearing member which is elastically deformable in a direction in which the motor shaft rotates.

5. The electric motor in claim 4, wherein said elastic bearing member is provided by radially arranging spokes made of a metal plate having an elasticity between an inner ring and an outer ring.

6. The electric motor as claimed in claim 4, wherein said detection means is a displacement detection element for detecting a displacement of a projection section provided at said stator side member.

7. The electric motor as claimed in claim 5, wherein said detection means is a displacement detection element for detecting a displacement of a projection section provided at said stator side member.

8. The electric motor as claimed in claim 10, wherein said displacement detection element is a non-contact nonresistant digital scale.

9. The electric motor as claimed in claim 7, wherein said displacement detection element is a non-contact nonresistant digital scale.

10. An electric motor, comprising:

a rotor having a motor shaft supported on a casing;

a stator supported on the casing at the both ends thereof by only an elastic member; and a detection means for detecting a rotational force of the stator, whereby the control of stopping, accelerating, decelerating or reversing operation of the motor drive system is executed based on a detection signal of the detection means.

11. The electric motor as claimed in claim 10, wherein a pair of ring-shaped stator support members is provided on both ends of the stator, and wherein a cylindrical projection section is arranged coaxially with the motor shaft on an inner surface of the casing, whereby said stator support member is supported on the cylindrical projection section of said casing by an elastic bearing member which is elastically deformable in a direction in which the motor shaft rotates.

12. The electric motor as claimed in claim 11, wherein said elastic bearing member is provided by radially arranging spokes made of a metal plate having an elasticity between an inner ring and an outer ring.

13. The electric motor as claimed in claim 10, wherein said detection means is a displacement detection element for detecting a displacement of a projection section provided at said stator side member.

14. The electric motor as claimed in claim 13, wherein said displacement detection element is a non-contact non-resistant digital scale.

* * * * *